(12) United States Patent
Sun et al.

(10) Patent No.: US 11,483,737 B2
(45) Date of Patent: Oct. 25, 2022

(54) RRC MESSAGE TRANSMISSION METHOD AND DEVICE

(71) Applicant: DATANG MOBILE COMMUNICATIONS EQUIPMENT CO., LTD., Beijing (CN)

(72) Inventors: Jiancheng Sun, Beijing (CN); Haiyang Quan, Beijing (CN); Huiying Zhang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 17/273,283

(22) PCT Filed: Aug. 7, 2019

(86) PCT No.: PCT/CN2019/099629
§ 371 (c)(1),
(2) Date: Mar. 3, 2021

(87) PCT Pub. No.: WO2020/063122
PCT Pub. Date: Apr. 2, 2020

(65) Prior Publication Data
US 2021/0211933 A1    Jul. 8, 2021

(30) Foreign Application Priority Data

Sep. 27, 2018 (CN) .......................... 201811134359.2

(51) Int. Cl.
*H04W 28/06* (2009.01)
*H04W 76/27* (2018.01)
(Continued)

(52) U.S. Cl.
CPC ............. *H04W 28/06* (2013.01); *H04L 69/04* (2013.01); *H04W 76/27* (2018.02); *H04W 80/02* (2013.01)

(58) Field of Classification Search
None
See application file for complete search history.

(56) References Cited

U.S. PATENT DOCUMENTS

| 9,967,695 | B2 | 5/2018 | Vrind | |
| 2011/0300889 | A1* | 12/2011 | Lee | ........................ H04W 80/00 |
| | | | | 455/509 |
| 2016/0112823 | A1 | 4/2016 | Vrind et al. | |
| 2016/0142518 | A1* | 5/2016 | Raina | ................ H04W 28/0289 |
| | | | | 370/230 |

(Continued)

FOREIGN PATENT DOCUMENTS

| CN | 102131234 A | 7/2011 |
| CN | 102215531 A | 10/2011 |

(Continued)

OTHER PUBLICATIONS

RAN2, "Reply LS on optimisation of UE capability signalling", 3GPP TSG RAN Meeting #81, Gold Coast, Australia, Sep. 10-13, 2018, total 2 pages, RP-181512(R2-1810966).

(Continued)

*Primary Examiner* — Diane L Lo
(74) *Attorney, Agent, or Firm* — Kilpatrick Townsend & Stockton, LLP

(57) ABSTRACT

Provided by the present application are a data transmission method and device, which are used to solve the problem of being unable to accurately transmit an RRC message which is too large. The method comprises: when determining that the length of an original RRC message exceeds a preset threshold, compressing the original RRC message; packag- (Continued)

ing the compressed RRC message into a PDCP PDU; and sending the packaged PDCP PDU to a receiving end.

16 Claims, 5 Drawing Sheets

(51) Int. Cl.
*H04L 69/04* (2022.01)
*H04W 80/02* (2009.01)

(56) References Cited

U.S. PATENT DOCUMENTS

| | | | |
|---|---|---|---|
| 2017/0094560 A1* | 3/2017 | Pani | H04L 47/14 |
| 2018/0146467 A1 | 5/2018 | Kim et al. | |
| 2018/0242192 A1 | 8/2018 | Zhao et al. | |
| 2019/0090156 A1* | 3/2019 | Kim | H04L 69/04 |
| 2020/0187050 A1* | 6/2020 | Yi | H04W 28/0278 |

FOREIGN PATENT DOCUMENTS

| | | |
|---|---|---|
| CN | 102546547 A | 7/2012 |
| CN | 103747097 A | 4/2014 |
| CN | 106332178 A | 1/2017 |
| CN | 107094142 A | 8/2017 |
| CN | 107113291 A | 8/2017 |
| WO | 2017096592 A1 | 6/2017 |
| WO | 2018156954 A1 | 8/2018 |

OTHER PUBLICATIONS

RAN3,"Reply LS on maximum size of UE Radio Capabilities and maximum information Element size on network interfaces", 3GPP TSG-RAN WG3 Meeting #101, Gothenburg, Sweden, Aug. 20-24, 2018, total 1 page, R3-185104.
MediaTek Inc. et al.,"New SID: Study on optimisations on UE radio capability signaiiing-NR/E-UTRA Aspects," TSG RAN Meeting #RP-80, Jun. 13-15, 2018, La Jolla, California, USA, total 4 pages, RP-181459.

* cited by examiner

--prior art--

RRC MESSAGE TRANSMISSION METHOD AND DEVICE

CROSS-REFERENCE OF RELATED APPLICATIONS

The present application is a National Stage of International Application PCT/CN2019/099629, filed Aug. 7, 2019, which claims the priority from Chinese Patent Application No. 201811134359.2, filed with the China National Intellectual Property Administration on Sep. 27, 2018, the entire content of which is hereby incorporated by reference.

FIELD

The present application relates to the field of mobile communications, and particularly to a data transmission method and device.

BACKGROUND

In the 5th-Generation (5G) mobile communication system, the sizes of some Radio Resource Control (RRC) messages (such as UE capability information message) may be very large and even exceed the maximum byte length that can be carried by the Packet Data Convergence Protocol (PDCP) Protocol Data Unit (PDU), which will cause the sending end to fail to send the RRC messages to the receiving end correctly. Therefore, there is an urgent need to provide an effective data transmission solution to solve the problem that the super-large RRC message(s) cannot be correctly transmitted.

BRIEF SUMMARY

Embodiments of the present application provide a data transmission method and device, to solve the problem that the super-large RRC message(s) cannot be correctly transmitted in the prior art.

In a first aspect, an embodiment of the present application provides a data transmission method, including:

compressing an original RRC message when determining that a length of the original RRC message exceeds a preset threshold;

packaging a compressed RRC message into a PDCP PDU; and sending a packaged PDCP PDU to a receiving end.

In this embodiment, when the length of the original RRC message exceeds the preset threshold, the original RRC message is compressed, so that the compressed RRC message can adapt to the limitation on the packet length of the PDCP PDU, solving the problem that the super-large RRC message cannot be correctly transmitted and ensuring the integrity of data transmission.

In one embodiment, the preset threshold is less than or equal to a maximum length of data carried by the PDCP PDU.

In this embodiment, the compressed RRC message can adapt to the limitation on the packet length of the PDCP PDU, solving the problem that the super-large RRC message cannot be correctly transmitted and ensuring the integrity of data transmission.

In one embodiment, the header information of the packaged PDCP PDU includes a first preset field, and the first preset field is for indicating whether an RRC message in the packaged PDCP PDU is the compressed RRC message.

In this embodiment, the receiving end can distinguish whether the packaged PDCP PDU received uses a compression mechanism based on the first preset field, ensuring the reliability of data transmission.

In one embodiment, the first preset field is on first four bits or a first bit of a first byte of the packaged PDCP PDU.

In this embodiment, the receiving end can determine whether the packaged PDCP PDU received uses a compression mechanism based on the first four bits of the first byte of the PDCP PDU, ensuring the reliability of data transmission.

In one embodiment, the header information of the packaged PDCP PDU includes a second preset field, and the second preset field is for indicating a compression algorithm used for compressing the original RRC message.

In this embodiment, the receiving end can distinguish the compression algorithm used for compressing the original RRC message based on the second preset field, and then use the corresponding decompression algorithm to decompress the data to obtain the original RRC message, ensuring the reliability of data transmission.

In one embodiment, the second preset field is on first four bits of a first byte of the packaged PDCP PDU; or the second preset field is on second and third bits of a first byte of the packaged PDCP PDU; or the second preset field is on second, third and fourth bits of a first byte of the packaged PDCP PDU.

In this embodiment, the receiving end can determine the compression algorithm used for compressing the original RRC message based on the first four bits of the first byte of the PDCP PDU, and then use the corresponding decompression algorithm to decompress the data to obtain the original RRC message, ensuring the reliability of data transmission.

In one embodiment, the compression algorithm is any one of a deflate algorithm, a zlib algorithm or a gzip algorithm.

This embodiment provides many kinds of compression algorithms to improve the flexibility of data transmission.

In a second aspect, an embodiment of the present application provides a data transmission method, including:

receiving a packaged PDCP PDU sent by a sending end; and decompressing an RRC message in the packaged PDCP PDU to obtain an original RRC message when determining that the RRC message in the packaged PDCP PDU is a compressed RRC message.

In one embodiment, a length of the original RRC message exceeds a preset threshold, and the preset threshold is less than or equal to a maximum length of data carried by a PDCP PDU.

In one embodiment, determining that the RRC message in the packaged PDCP PDU is a compressed RRC message, includes:

acquiring a first preset field from header information of the packaged PDCP PDU; and determining that the RRC message in the packaged PDCP PDU is the compressed RRC message according to the first preset field.

In one embodiment, acquiring a first preset field from header information of the packaged PDCP PDU, includes:

acquiring a field on first four bits of a first byte of the packaged PDCP PDU; or acquiring a field on a first bit of a first byte of the packaged PDCP PDU.

In one embodiment, decompressing an RRC message in the packaged PDCP PDU, includes:

acquiring a second preset field from header information of the packaged PDCP PDU;

determining a compression algorithm used for the RRC message in the packaged PDCP PDU according to the second preset field; and decompressing the RRC message in the packaged PDCP PDU by using a decompression algorithm corresponding to the compression algorithm.

In one embodiment, acquiring a second preset field from header information of the packaged PDCP PDU, includes:

acquiring a field on first four bits of a first byte of the packaged PDCP PDU; or acquiring a field on second and third bits of a first byte of the packaged PDCP PDU; or acquiring a field on second, third and fourth bits of a first byte of the packaged PDCP PDU.

In one embodiment, the compression algorithm is any one of a deflate algorithm, a zlib algorithm or a gzip algorithm.

In a third aspect, an embodiment of the present application provides a data transmission device, including:

at least one processor, and a memory and a communication interface communicatively connected to the at least one processor.

The processor is configured to execute computer instructions in the memory, to compress an original RRC message when determining that a length of the original RRC message exceeds a preset threshold and package a compressed RRC message into a PDCP PDU; and the communication interface is configured to send a packaged PDCP PDU to a receiving end.

In one embodiment, the preset threshold is less than or equal to a maximum length of data carried by the PDCP PDU.

In one embodiment, the header information of the packaged PDCP PDU includes a first preset field, and the first preset is for indicating whether an RRC message in the packaged PDCP PDU is the compressed RRC message.

In one embodiment, the first preset field is on first four bits or a first bit of a first byte of the packaged PDCP PDU.

In one embodiment, the header information of the packaged PDCP PDU includes a second preset field, and the second preset is for indicating a compression algorithm used for compressing the original RRC message.

In one embodiment, the second preset field is on first four bits of a first byte of the packaged PDCP PDU; or the second preset field is on second and third bits of a first byte of the packaged PDCP PDU; or the second preset field is on second, third and fourth bits of a first byte of the packaged PDCP PDU.

In one embodiment, the compression algorithm is any one of a deflate algorithm, a zlib algorithm or a gzip algorithm.

In a fourth aspect, an embodiment of the present application provides a data transmission device, including:

at least one processor, and a memory and a communication interface communicatively connected to the at least one processor.

The communication interface is configured to receive a packaged PDCP PDU sent by a sending end;

the processor is configured to execute computer instructions in the memory, to decompress an RRC message in the packaged PDCP PDU to obtain an original RRC message when determining that the RRC message in the packaged PDCP PDU is a compressed RRC message.

In one embodiment, a length of the original RRC message exceeds a preset threshold, and the preset threshold is less than or equal to a maximum length of data carried by a PDCP PDU.

In one embodiment, the processor is specifically configured to:

acquire a first preset field from header information of the packaged PDCP PDU; and determine that the RRC message in the packaged PDCP PDU is the compressed RRC message according to the first preset field.

In one embodiment, the processor is further configured to:

acquire a field on first four bits of a first byte of the packaged PDCP PDU; or acquire a field on a first bit of a first byte of the packaged PDCP PDU.

In one embodiment, the processor is further configured to:

acquire a second preset field from header information of the packaged PDCP PDU;

determine a compression algorithm used for the RRC message in the packaged PDCP PDU according to the second preset field; and decompress the RRC message in the packaged PDCP PDU by using a decompression algorithm corresponding to the compression algorithm.

In one embodiment, the processor is further configured to:

acquire a field on first four bits of a first byte of the packaged PDCP PDU; or acquire a field on second and third bits of a first byte of the packaged PDCP PDU; or acquire a field on second, third and fourth bits of a first byte of the packaged PDCP PDU.

In one embodiment, the compression algorithm is any one of a deflate algorithm, a zlib algorithm or a gzip algorithm.

In a fifth aspect, an embodiment of the present application provides a data transmission device, including:

a processing device configured to compress an original RRC message when determining that a length of the original RRC message exceeds a preset threshold; and package a compressed RRC message into a PDCP PDU; and a sending device configured to send a packaged PDCP PDU to a receiving end.

In one embodiment, the preset threshold is less than or equal to a maximum length of data carried by the PDCP PDU.

In one embodiment, the header information of the packaged PDCP PDU includes a first preset field and the first preset filed is for indicating whether an RRC message in the packaged PDCP PDU is the compressed RRC message.

In one embodiment, the first preset field is on first four bits or a first bit of a first byte of the packaged PDCP PDU.

In one embodiment, the header information of the packaged PDCP PDU includes a second preset field, and the second preset field is for indicating a compression algorithm used for compressing the original RRC message.

In one embodiment, the second preset field is on first four bits of a first byte of the packaged PDCP PDU; or the second preset field is on second and third bits of a first byte of the packaged PDCP PDU; or the second preset field is on second, third and fourth bits of a first byte of the packaged PDCP PDU.

In one embodiment, the compression algorithm is any one of a deflate algorithm, a zlib algorithm or a gzip algorithm.

In a sixth aspect, an embodiment of the present application provides a data transmission device, including:

a receiving device configured to receive a packaged PDCP PDU sent by a sending end; and a processing device configured to decompress an RRC message in the packaged PDCP PDU to obtain an original RRC message when determining that the RRC message in the packaged PDCP PDU is a compressed RRC message.

In one embodiment, a length of the original RRC message exceeds a preset threshold, and the preset threshold is less than or equal to a maximum length of data carried by a PDCP PDU.

In one embodiment, the processing device is further configured to: acquire a first preset field from header information of the packaged PDCP PDU; and determine that the RRC message in the packaged PDCP PDU is the compressed RRC message according to the first preset field.

In one embodiment, the processing device is further configured to: acquire a field on first four bits of a first byte of the packaged PDCP PDU; or acquire a field on a first bit of a first byte of the packaged PDCP PDU.

In one embodiment, the processing device is further configured to: acquire a second preset field from header information of the packaged PDCP PDU; determine a compression algorithm used for the RRC message in the packaged PDCP PDU according to the second preset field; and decompress the RRC message in the packaged PDCP PDU by using a decompression algorithm corresponding to the compression algorithm.

In one embodiment, the processing device is further configured to:

acquire a field on first four bits of a first byte of the packaged PDCP PDU; or acquire a field on second and third bits of a first byte of the packaged PDCP PDU; or acquire a field on second, third and fourth bits of a first byte of the packaged PDCP PDU.

In one embodiment, the compression algorithm is any one of a deflate algorithm, a zlib algorithm or a gzip algorithm.

In a seventh aspect, an embodiment of the present application provides a computer readable storage medium storing computer instructions, and the computer instructions running on a computer causes the computer to perform the method as described in the first aspect of the embodiments of the present application.

In an eighth aspect, an embodiment of the present application provides a computer readable storage medium storing computer instructions, and the computer instructions running on a computer causes the computer to perform the method as described in the second aspect of the embodiments of the present application.

BRIEF DESCRIPTION OF THE DRAWINGS

In order to illustrate the embodiments of the present application more clearly, the accompanying figures which need to be used in describing the embodiments will be introduced below briefly. The accompanying figures described below are only some embodiments of the present application.

DETAILED DESCRIPTION OF THE EMBODIMENTS

Figure 1:
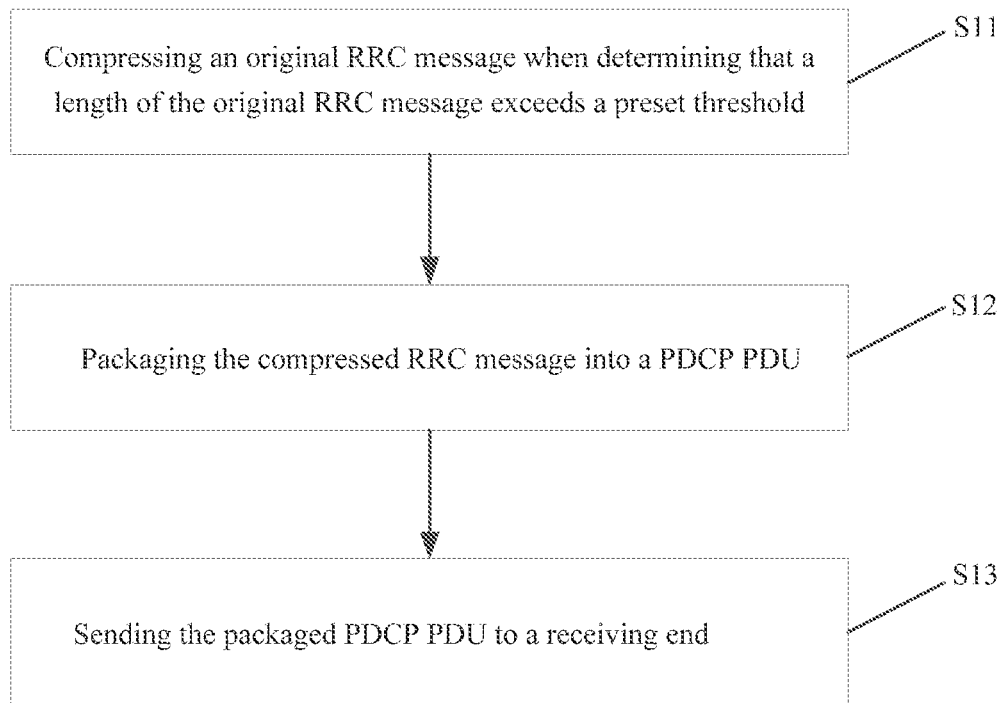
FIG. 1 is a schematic flowchart of a data transmission method in an embodiment of the present application.

Embodiments of the present application will be illustrated below in details by way of the drawings and embodiments, and it should be understood that the embodiments of the present application and features in the embodiments are intended to illustrate the embodiments of the present application in details but not limit the embodiments of the present application, and the embodiments of the present application and the features in the embodiments can be combined with each other without collision.

The embodiments of the present application can be applicable to the 5G system; and can also be applicable to other wireless communication systems, e.g., Long Term Evolution (LTE) system, Global System for Mobile Communication (GSM), Universal Mobile Telecommunications System (UMTS), Code Division Multiple Access (CDMA) system, new network device systems and the like.

UE involved in the embodiments of the present application may refer to a device for providing voice and/or data connectivity to the user, a handheld device with the wireless connection function, or other processing device connected to a wireless modem. A wireless user terminal can communicate with one or more core networks via the Radio Access Network (RAN), and the wireless user terminal may be a mobile terminal, such as a mobile telephone (or called "cellular" telephone), and a computer with the mobile terminal, for example, can be a portable, pocket, handheld, computer built-in or in-vehicle mobile device. The wireless user terminals exchange the voice and/or data with the radio access network, and for example include a Personal Communication Service (PCS) telephone, a cordless telephone, a Session Initiation Protocol (SIP) telephone, a Wireless Local Loop (WLL) station, a Personal Digital Assistant (PDA) and other devices. The wireless user terminal can also be called system, Subscriber Unit, Subscriber Station, Mobile Station, Remote Station, Access Point, Remote Terminal, Access Terminal, User Terminal, User Agent, User Device.

The base station involved in the embodiments of the present application can be used to perform the interconversion between the received air frame and the IP packet, and used as the router between the wireless terminal device and the rest of the access network. The rest of the access network may include Internet Protocol (IP) network devices. The base station can further coordinate the attribute management of the air interface. For example, the base station can be the network device in the 5G system, such as Next generation Node B (gNB), or can be the Base Transceiver Station (BTS) in the GSM or CDMA, or can be the NodeB in the Wideband Code Division Multiple Access (WCDMA), or can be the evolutional Node B (eNB or e-NodeB) in the LTE, which is not limited by the embodiments of the present application.

It should be understood that the word such as "first" or "second" in the description of the embodiments of the present application is only for purpose of distinguishing the description, and cannot be construed to indicate or imply the relative importance and cannot be construed to indicate or imply the order either. In the description of the embodiments of the present application, "a plurality of" refers to two or more.

The term "and/or" in the embodiments of the present application is simply an association relationship describing the associated objects, indicating that there may be three relationships, for example, A and/or B may represent: only A, both A and B, and only B. Furthermore, the character "/" herein generally indicates that the associated objects before and after the character have a kind of "or" relationship.

Embodiments of the present application provide a data transmission method and device, to solve the problem that the super-large RRC message cannot be correctly transmitted in the prior art.

Referring to FIG. 1, a method at the sending end includes the following operations.

S11: compressing an original RRC message when determining that a length of the original RRC message exceeds a preset threshold.

Here, the preset threshold for deciding whether to compress the RRC message may be equal to the maximum data length that can be carried by the PDCP PDU, namely 9000 bytes, or may be less than the maximum data length that can be carried by the PDCP PDU. For example, the compression is performed when the original RRC message exceeds 5000 bytes, which is not limited in the embodiments of the present application.

Here, the implementation of compressing the original RRC message may be to invoke a kernel compression algorithm similar to rar/zip to compress the original RRC message to shorten its length, e.g., use the deflate algorithm, zlib algorithm and gzip algorithm, etc., which is not limited in the embodiments of the present application.

S12: packaging the compressed RRC message into a PDCP PDU.

S13: sending the packaged PDCP PDU to a receiving end.

In the implementation process, the execution subject of the foregoing operations S11 to S13 may be a UE or base station, which is not limited in the embodiments of the present application. When the execution subject of the above method is a base station, the original RRC message is a downlink RRC message, and the receiving end is a UE; when the execution subject is a UE, the original RRC message is an uplink RRC message, and the receiving end is a base station. For example, the execution subject is a UE, and the original RRC message is a UE capability information message reported by the UE.

Figure 2:
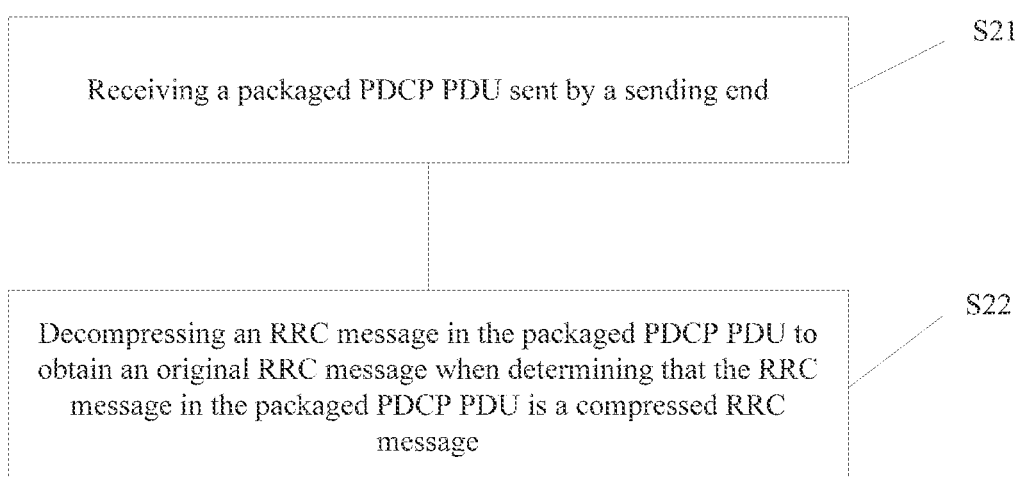
FIG. 2 is a schematic flowchart of a data transmission method in an embodiment of the present application.

Accordingly, referring to FIG. 2, a method at the receiving end includes the following operations.

S21: receiving a packaged PDCP PDU sent by a sending end.

S22: decompressing an RRC message in the packaged PDCP PDU to obtain an original RRC message when determining that the RRC message in the packaged PDCP PDU is a compressed RRC message.

In the embodiments of the present application, when the length of the original RRC message exceeds the preset threshold, the original RRC message is compressed, so that the compressed RRC message can adapt to the limitation on the packet length of the PDCP PDU, solving the problem that the super-large RRC message cannot be correctly transmitted and ensuring the integrity of data transmission.

Further, in order to enable the receiving end to distinguish whether the packaged PDCP PDU received uses a compression mechanism, the PDCP PDU header format in embodiments of the present application can be adjusted accordingly.

Specifically, a first preset field may be added to the header information of the packaged PDCP PDU. The first preset field is used to indicate whether the RRC message in the packaged PDCP PDU is the compressed RRC message.

Accordingly, the receiving end determines that the RRC message in the packaged PDCP PDU is a compressed RRC message, including: acquiring the first preset field from the header information of the packaged PDCP PDU; and then determining that the RRC message in the packaged PDCP PDU is the compressed RRC message according to the first preset field.

Further, considering that different self-compression algorithms/modes may be applied, in order to enable the receiving end to distinguish the compression algorithm used by the packaged PDCP PDU received, it is also possible to add a second preset field to the header information of the packaged PDCP PDU to indicate the compression algorithm used for compressing the original RRC message.

Accordingly, the receiving end decompresses the RRC message in the packaged PDCP PDU, including: acquiring the second preset field from the header information of the packaged PDCP PDU; then determining the compression algorithm used for the RRC message in the packaged PDCP PDU according to the second preset field; and decompressing the RRC message in the packaged PDCP PDU by using a decompression algorithm corresponding to the compression algorithm.

Figure 3:
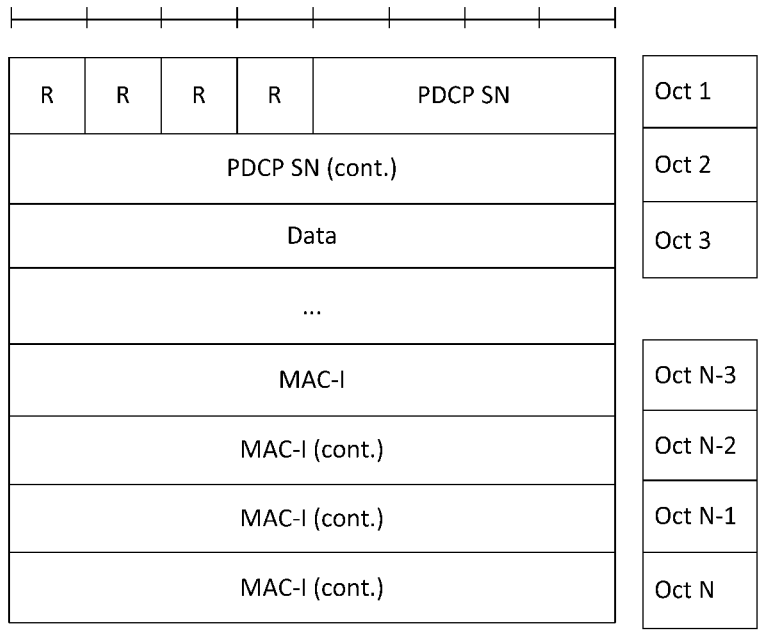
FIG. 3 is a schematic diagram of the PDCP PDU format in the prior art.

FIG. 3 is the format of PDCP PDU used to transmit signaling on the Signaling Radio Bearer (SRB) in the current 5G NR system. The English abbreviations in FIG. 3 are explained as follows.

R: Reserved, reserved bits.

PDCP SN: PDCP Sequence Number, the sequence number of the PDCP PDU.

PDCP SN (cont.): PDCP Sequence Number (Continued), the second half of the sequence number of the PDCP PDU (combined with the PDCP SN in the previous byte to form the real PDCP SN).

Data: the data carried in the PDCP PDU.

MAC-I: Message authentication code-Integrity, a message authentication code used to protect the integrity of signaling messages.

MAC-I (cont.): the subsequent content of MAC-I, the combination of all MAC-I and MAC-I (Cont.) in byte order is the real MAC-I.

Oct1-OctN: byte 1 to byte N.

The first four bits of the first byte of the existing PDCP PDU are not used, so it can be considered to extend them. A first preset field and/or a second preset field is/are set on the first four bits of the first byte of the packaged PDCP PDU. For example, the first bit of the first byte indicates whether the RRC message in the packaged PDCP PDU is a compressed RRC message, and the second and third bits of the first byte indicate the compression algorithm used for compressing the original RRC message, or the second, third and fourth bits of the first byte indicate the compression algorithm used for compressing the original RRC message.

Figure 4:
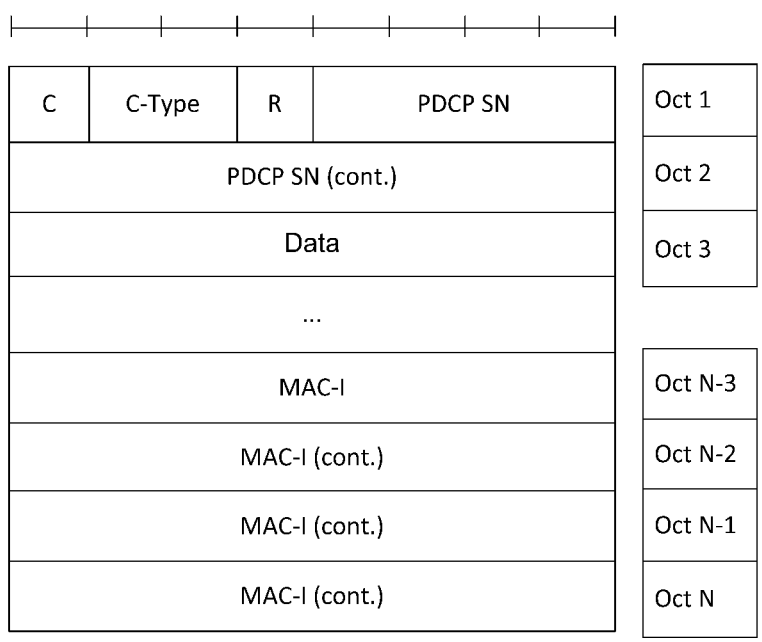
FIG. 4 is a schematic diagram of the PDCP PDU format in an embodiment of the present application.

For example, FIG. 4 is a schematic diagram of a possible format of the packaged PDCP PDU.

C: compression indication, 1 means that the data packet is compressed, and 0 means that the compression is not enabled.

C-type: compression algorithm, this field is only valid when C is 1. Possible algorithms include: Deflate algorithm, zlib algorithm and gzip algorithm, etc., such as:

00: Deflate;
01: zlib;

10: gzip;

11: other possible compression algorithm.

In order to facilitate the clearer understanding of the embodiments of the present application, several specific and complete embodiments are listed below for detailed description.

First Embodiment: the size of the UE capability information message is 300 bytes.

Figure 5:
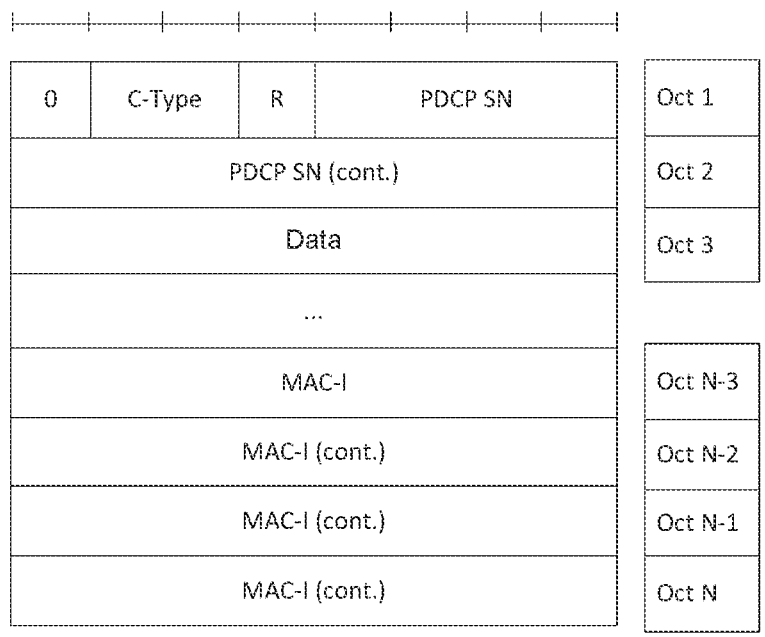
FIG. 5 is a schematic diagram of the PDCP PDU format in an embodiment of the present application.

The sending end does not compress the relatively small RRC message, so the PDCP PDU header indicates that the data packet is not compressed. As shown in FIG. 5, the Data part in FIG. 5 has not been compressed.

Second Embodiment: the size of the UE capability information message is 12000 bytes.

In this case, the size of the RRC message exceeds the upper limit of the PDCP PDU (9000 bytes) and must be compressed.

Specifically, the UE compresses the RRC message to about 6000-8400 bytes, so that the compressed RRC message can be packaged in one PDCP PDU.

Figure 6:
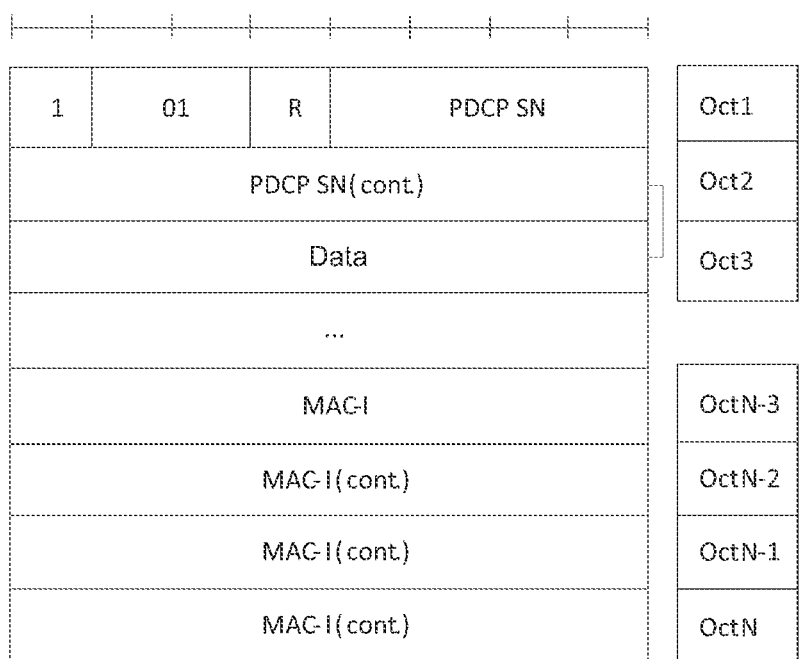
FIG. 6 is a schematic diagram of the PDCP PDU format in an embodiment of the present application.

Further, the UE indicates, in the packet header of the PDCP PDU, compression being applied to the data packet and the compression algorithm used. For example, referring to FIG. 6, C in the packet header is 1, indicating that the data packet is compressed. C-Type is 01, indicating that the compression algorithm used by the data packet is the algorithm corresponding to 01, such as zlib algorithm. The following Data part is filled with the compressed byte stream, such as 8000 bytes of data.

Accordingly, after receiving the PDCP PDU, the network side determines that the data in the PDCP PDU is compressed according to the packet header and determines the compression algorithm used, then decompresses the received PDCP PDU in the decompression mode corresponding to the compression algorithm and sends the obtained UE capability information message to the RRC layer.

Third Embodiment: the size of the UE capability information message is 6000 bytes.

In this case, the RRC message is relatively large but does not exceed the upper limit of the PDCP PDU, so there are two processing schemes:

1) not compress, the processing method is the same as that in the first embodiment. The PDCP data packet format is the same as that in the first embodiment;

2) compress, the processing method is the same as that in the second embodiment, and the PDCP data packet format is the same as that in the second embodiment. Of course, the compression algorithm may be different, depending on the implementation.

Figure 7:
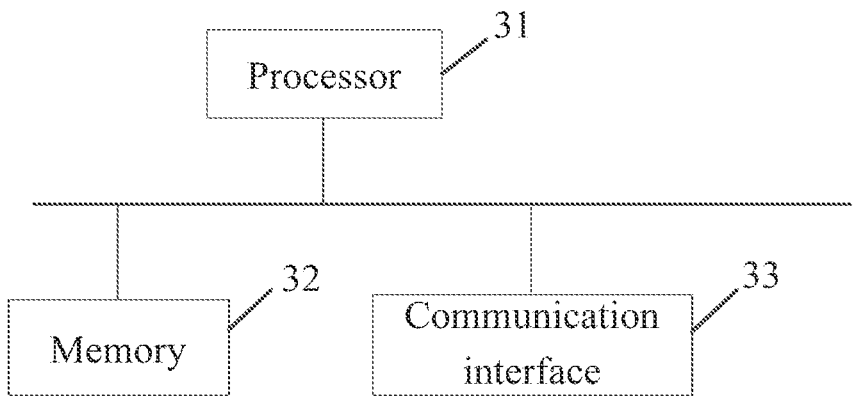
FIG. 7 is a structural schematic diagram of a data transmission device in an embodiment of the present application.

Based on the same inventive concept, embodiments of the present application further provide a data transmission device, referring to FIG. 7, including:

at least one processor 31, and a memory 32 and a communication interface 33 communicatively connected to the at least one processor 31;

the processor 31 is configured to execute computer instructions in the memory 32, to compress an original RRC message when determining that the length of the original RRC message exceeds a preset threshold and package a compressed RRC message into a PDCP PDU; and the communication interface 33 is configured to send a packaged PDCP PDU to a receiving end.

In one embodiment, the preset threshold is less than or equal to a maximum length of data carried by the PDCP PDU.

In one embodiment, the header information of the packaged PDCP PDU includes a first preset field, and the first preset field is for indicating whether an RRC message in the packaged PDCP PDU is the compressed RRC message.

In one embodiment, the first preset field is on first four bits or a first bit of a first byte of the packaged PDCP PDU.

In one embodiment, the header information of the packaged PDCP PDU includes a second preset field, and the second preset field is for indicating a compression algorithm used for compressing the original RRC message.

In one embodiment, the second preset field is on first four bits of a first byte of the packaged PDCP PDU; or the second preset field is on second and third bits of a first byte of the packaged PDCP PDU; or the second preset field is on second, third and fourth bits of a first byte of the packaged PDCP PDU.

In one embodiment, the compression algorithm is any one of a deflate algorithm, a zlib algorithm or a gzip algorithm.

The method and device described in the present application are based on the same inventive concept. Since the principle of solving the problem in the method is similar to that in the device, the implementations of the operations performed by each part of the above device may refer to the corresponding operations in the above data transmission method of the embodiments of the present application. Thus the implementations of the method and the device may refer to each other, and the repeated description thereof will be omitted.

Figure 8:
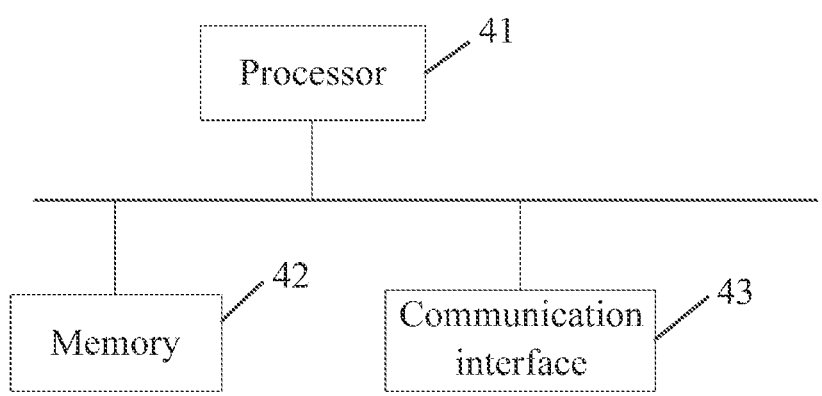
FIG. 8 is a structural schematic diagram of a data transmission device in an embodiment of the present application.

Based on the same inventive concept, embodiments of the present application further provide a data transmission device, referring to FIG. 8, including:

at least one processor 41, and a memory 42 and a communication interface 43 communicatively connected to the at least one processor 41;

the communication interface 43 is configured to receive a packaged PDCP PDU sent by a sending end; and the processor 41 is configured to execute computer instructions in the memory 42, to decompress an RRC message in the packaged PDCP PDU to obtain an original RRC message when determining that the RRC message in the packaged PDCP PDU is a compressed RRC message.

In one embodiment, the length of the original RRC message exceeds a preset threshold, and the preset threshold is less than or equal to a maximum length of data carried by a PDCP PDU.

In one embodiment, the processor 41 is further configured to:

acquire a first preset field from header information of the packaged PDCP PDU; and determine that the RRC message in the packaged PDCP PDU is the compressed RRC message according to the first preset field.

In one embodiment, the processor 41 is further configured to:

acquire a field on first four bits of a first byte of the packaged PDCP PDU; or acquire a field on a first bit of a first byte of the packaged PDCP PDU.

In one embodiment, the processor 41 is further configured to:

acquire a second preset field from header information of the packaged PDCP PDU; and determine a compression algorithm used for the RRC message in the packaged PDCP PDU according to the second preset field; and decompress the RRC message in the packaged PDCP PDU by using a decompression algorithm corresponding to the compression algorithm.

In one embodiment, the processor 41 is further configured to:

acquire a field on first four bits of a first byte of the packaged PDCP PDU; or acquire a field on second and third bits of a first byte of the packaged PDCP PDU; or acquire a field on second, third and fourth bits of a first byte of the packaged PDCP PDU.

In one embodiment, the compression algorithm is any one of a deflate algorithm, a zlib algorithm or a gzip algorithm.

The method and device described in the present application are based on the same inventive concept. Since the principle of solving the problem in the method is similar to that in the device, the implementations of the operations performed by each part of the above device may refer to the corresponding operations in the above data transmission method of the embodiments of the present application. Thus the implementations of the method and the device may refer to each other, and the repeated description thereof will be omitted.

Figure 9:
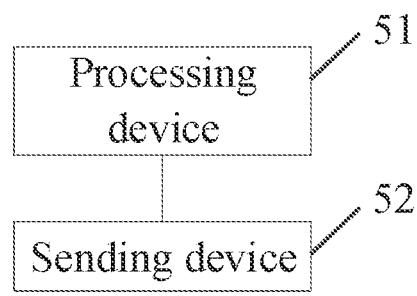
FIG. 9 is a structural schematic diagram of a data transmission device in an embodiment of the present application.

Based on the same inventive concept, embodiments of the present disclosure further provide a data transmission device, referring to FIG. 9, including:

a processing device 51 configured to compress an original RRC message when determining that the length of the original RRC message exceeds a preset threshold; and package a compressed RRC message into a PDCP PDU;

a sending device 52 configured to send a packaged PDCP PDU to a receiving end.

In one embodiment, the preset threshold is less than or equal to a maximum length of data carried by the PDCP PDU.

In one embodiment, the header information of the packaged PDCP PDU includes a first preset field, and the first preset field is for indicating whether an RRC message in the packaged PDCP PDU is the compressed RRC message.

In one embodiment, the first preset field is on first four bits or a first bit of a first byte of the packaged PDCP PDU.

In one embodiment, the header information of the packaged PDCP PDU includes a second preset field, and the second preset field is for indicating a compression algorithm used for compressing the original RRC message.

In one embodiment, the second preset field is on first four bits of a first byte of the packaged PDCP PDU; or the second preset field is on second and third bits of a first byte of the packaged PDCP PDU; or the second preset field is on second, third and fourth bits of a first byte of the packaged PDCP PDU.

In one embodiment, the compression algorithm is any one of a deflate algorithm, a zlib algorithm or a gzip algorithm.

The method and device described in the present application are based on the same inventive concept. Since the principle of solving the problem in the method is similar to that in the device, the implementations of the operations performed by each device may refer to the corresponding operations in the above data transmission method of the embodiments of the present application. Thus the implementations of the method and the device may refer to each other, and the repeated description thereof will be omitted.

Figure 10:
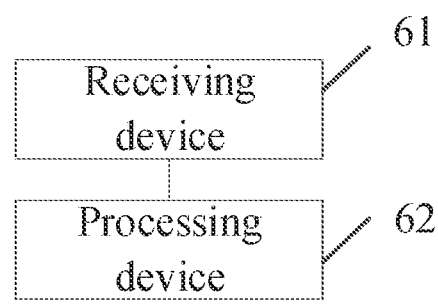
FIG. 10 is a structural schematic diagram of a data transmission device in an embodiment of the present application.

Based on the same inventive concept, embodiments of the present application further provide a data transmission device, referring to FIG. 10, including:

a receiving device 61 configured to receive a packaged PDCP PDU sent by a sending end;

a processing device 62 configured to decompress an RRC message in the packaged PDCP PDU to obtain an original RRC message when determining that the RRC message in the packaged PDCP PDU is a compressed RRC message.

In one embodiment, the length of the original RRC message exceeds a preset threshold, and the preset threshold is less than or equal to the maximum length of data carried by a PDCP PDU.

In one embodiment, the processing device 62 is further configured to: acquire a first preset field from the header information of the packaged PDCP PDU; and determine that the RRC message in the packaged PDCP PDU is the compressed RRC message according to the first preset field.

In one embodiment, the processing device 62 is further configured to: acquire a field on first four bits of a first byte of the packaged PDCP PDU; or acquire a field on a first bit of a first byte of the packaged PDCP PDU.

In one embodiment, the processing device 62 is further configured to: acquire a second preset field from the header information of the packaged PDCP PDU; determine a compression algorithm used for the RRC message in the packaged PDCP PDU according to the second preset field; and decompress the RRC message in the packaged PDCP PDU by using a decompression algorithm corresponding to the compression algorithm.

In one embodiment, the processing device 62 is further configured to:

acquire a field on first four bits of a first byte of the packaged PDCP PDU; or acquire a field on second and third bits of a first byte of the packaged PDCP PDU; or acquire a field on second, third and fourth bits of a first byte of the packaged PDCP PDU.

In one embodiment, the compression algorithm is any one of a deflate algorithm, a zlib algorithm or a gzip algorithm.

The method and device described in the present application are based on the same inventive concept. Since the principle of solving the problem in the method is similar to that in the device, the implementations of the operations performed by each device may refer to the corresponding operations in the above data transmission method of the embodiments of the present application. Thus the implementations of the method and the device may refer to each other, and the repeated description thereof will be omitted.

Based on the same inventive concept, embodiments of the present application further provide a computer readable storage medium storing the computer instructions, the computer instructions running on a computer causes the computer to perform the above data transmission method at the sending end of the embodiments of the present application.

Based on the same inventive concept, embodiments of the present application further provide a computer readable storage medium storing the computer instructions, the computer instructions running on a computer causes the computer to perform the above data transmission method at the receiving end of the embodiments of the present application.

One or more embodiments of the present application have at least the following aspects.

When the length of the original RRC message exceeds the preset threshold, the original RRC message is compressed, so that the compressed RRC message can adapt to the limitation on the packet length of the PDCP PDU, solving the problem that the super-large RRC message cannot be correctly transmitted and ensuring the integrity of data transmission.

Embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

What is claimed is:

1. An RRC message transmission method, comprising:
compressing an original Radio Resource Control, RRC, message when determining that a length of the original RRC message exceeds a preset threshold;
packaging a compressed RRC message into a Packet Data Convergence Protocol, PDCP, Protocol Data Unit, PDU; and
sending a packaged PDCP PDU to a receiving end;
wherein header information of the packaged PDCP PDU comprises a first preset field, and the first preset field is for indicating whether an RRC message in the packaged PDCP PDU is the compressed RRC message; and
wherein header information of the packaged PDCP PDU comprises a second preset field, and the second preset field is for indicating a compression algorithm used for compressing the original RRC message; the compression algorithm is any one of a deflate algorithm, a zlib algorithm; or a gzip algorithm.

2. The method of claim 1, wherein the preset threshold is less than or equal to a maximum length of data carried by the PDCP PDU.

3. The method of claim 1, wherein the first preset field is on first four bits or a first bit of a first byte of the packaged PDCP PDU.

4. The method of claim 1, wherein:
the second preset field is on first four bits of a first byte of the packaged PDCP PDU; or
the second preset field is on second and third bits of a first byte of the packaged PDCP PDU; or
the second preset field is on second, third and fourth bits of a first byte of the packaged PDCP PDU.

5. An RRC message transmission method, comprising:
receiving a packaged Packet Data Convergence Protocol, PDCP, Protocol Data Unit, PDU, sent by a sending end; and
decompressing an Radio Resource Control, RRC, message in the packaged PDCP PDU to obtain an original RRC message when determining that the RRC message in the packaged PDCP PDU is a compressed RRC message;
wherein the determining that the RRC message in the packaged PDCP PDU is a compressed RRC message, comprises:
acquiring a first preset field from header information of the packaged PDCP PDU; and
determining that the RRC message in the packaged PDCP PDU is the compressed RRC message according to the first preset field;
wherein the decompressing an RRC message in the packaged PDCP PDU, comprises:
acquiring a second preset field from header information of the packaged PDCP PDU; and
determining a compression algorithm used for the RRC message in the packaged PDCP PDU according to the second preset field; and
decompressing the RRC message in the packaged PDCP PDU by using a decompression algorithm corresponding to the compression algorithm; the compression algorithm is any one of a deflate algorithm, a zlib algorithm, or a gzip algorithm.

6. The method of claim 5, wherein a length of the original RRC message exceeds a preset threshold, and the preset threshold is less than or equal to a maximum length of data carried by a PDCP PDU.

7. The method of claim 5, wherein the acquiring a first preset field from header information of the packaged PDCP PDU, comprises:
acquiring a field on first four bits of a first byte of the packaged PDCP PDU; or acquiring a field on a first bit of a first byte of the packaged PDCP PDU.

8. The method of claim 5, wherein the acquiring a second preset field from header information of the packaged PDCP PDU, comprises:
acquiring a field on first four bits of a first byte of the packaged PDCP PDU; or
acquiring a field on second and third bits of a first byte of the packaged PDCP PDU; or
acquiring a field on second, third and fourth bits of a first byte of the packaged PDCP PDU.

9. An RRC message transmission device, comprising:
at least one processor, and
a memory and a communication interface communicatively connected to the at least one processor;
wherein the processor is configured to execute computer instructions in the memory, to:
compress an original Radio Resource Control, RRC, message when determining that a length of the original RRC message exceeds a preset threshold; and
package a compressed RRC message into a Packet Data Convergence Protocol, PDCP, Protocol Data Unit, PDU; and
the communication interface is configured to send a packaged PDCP PDU to a receiving end;
wherein header information of the packaged PDCP PDU comprises a first preset field, and the first preset field is for indicating whether an RRC message in the packaged PDCP PDU is the compressed RRC message; and
wherein header information of the packaged PDCP PDU comprises a second preset field, and the second preset field is for indicating a compression algorithm used for compressing the original RRC message, the compression algorithm is any one of a deflate algorithm, a zlib algorithm, or a gzip algorithm.

10. The device of claim 9, wherein the preset threshold is less than or equal to a maximum length of data carried by the PDCP PDU.

11. The device of claim 9, wherein the first preset field is on first four bits or a first bit of a first byte of the packaged PDCP PDU.

12. The device of claim 9, wherein:
the second preset field is on first four bits of a first byte of the packaged PDCP PDU; or
the second preset field is on second and third bits of a first byte of the packaged PDCP PDU; or
the second preset field is on second, third and fourth bits of a first byte of the packaged PDCP PDU.

13. An RRC message transmission device, comprising:
at least one processor, and
a memory and a communication interface communicatively connected to the at least one processor;
wherein the communication interface is configured to receive a packaged Packet Data Convergence Protocol, PDCP, Protocol Data Unit, PDU, sent by a sending end; and
the processor is configured to execute computer instructions in the memory, to:
decompress an Radio Resource Control, RRC, message in the packaged PDCP PDU to obtain an original RRC message when determining that the RRC message in the packaged PDCP PDU is a compressed RRC message;
wherein the processor is further configured to:
acquire a first preset field from header information of the packaged PDCP PDU; and
determine that the RRC message in the packaged PDCP PDU is the compressed RRC message according to the first preset field;
wherein the processor is further configured to:
acquire a second preset field from header information of the packaged PDCP PDU;
determine a compression algorithm used for the RRC message in the packaged PDCP PDU according to the second preset field; and
decompress the RRC message in the packaged PDCP PDU by using a decompression algorithm corresponding to the compression algorithm; the compression algorithm is any one of a deflate algorithm, a zlib algorithm, or a gzip algorithm.

14. The device of claim 13, wherein a length of the original RRC message exceeds a preset threshold, and the preset threshold is less than or equal to a maximum length of data carried by a PDCP PDU.

15. The device of claim 13, wherein the processor is further configured to:
acquire a field on first four bits of a first byte of the packaged PDCP PDU; or
acquire a field on a first bit of a first byte of the packaged PDCP PDU.

16. The device of claim 13, wherein the processor is further configured to:
acquire a field on first four bits of a first byte of the packaged PDCP PDU; or
acquire a field on second and third bits of a first byte of the packaged PDCP PDU; or
acquire a field on second, third and fourth bits of a first byte of the packaged PDCP PDU.

* * * * *